(12) United States Patent
Schulz et al.

(10) Patent No.: US 12,533,013 B2
(45) Date of Patent: Jan. 27, 2026

(54) HANDHELD SURGICAL DEVICE AND SHAFT FOR A HANDHELD SURGICAL DEVICE

(71) Applicant: OLYMPUS WINTER & IBE GMBH, Hamburg (DE)

(72) Inventors: Kevin Schulz, Wilstedt (DE); Irina Schmuck, Heide (DE); Bastian Schroeder, Hamburg (DE); Andreas Ruehs, Ahrensburg (DE)

(73) Assignee: OLYMPUS WINTER & IBE GMBH, Hamburg (DE)

( * ) Notice: Subject to any disclaimer, the term of this patent is extended or adjusted under 35 U.S.C. 154(b) by 366 days.

(21) Appl. No.: 18/120,269

(22) Filed: Mar. 10, 2023

(65) Prior Publication Data
US 2023/0309798 A1    Oct. 5, 2023

Related U.S. Application Data

(60) Provisional application No. 63/325,400, filed on Mar. 30, 2022.

(51) Int. Cl.
*A61B 1/00* (2006.01)
(52) U.S. Cl.
CPC ...... *A61B 1/00128* (2013.01); *A61B 1/00126* (2013.01)

(58) Field of Classification Search
CPC ............ A61B 1/00144; A61B 1/00128; A61B 1/00126; A61B 1/01; A61B 1/012; A61B 1/018
See application file for complete search history.

(56) References Cited

U.S. PATENT DOCUMENTS

| 5,976,077 | A | 11/1999 | Wittens et al. | |
|---|---|---|---|---|
| 2005/0131278 | A1* | 6/2005 | Dickopp | A61B 1/00098 600/107 |
| 2018/0338673 | A1* | 11/2018 | Krimsky | A61B 34/20 |

FOREIGN PATENT DOCUMENTS

| DE | 10 2004 043 460 B4 | 4/2016 |
|---|---|---|
| DE | 10 2016 003 175 A1 | 9/2017 |
| WO | 2004/037100 A1 | 5/2004 |

\* cited by examiner

*Primary Examiner* — Timothy J Neal
(74) *Attorney, Agent, or Firm* — Oliff PLC

(57) ABSTRACT

A shaft and a handheld surgical device with which an optical unit and an access article may be positioned in a simple and reliable way in the shaft. This is achieved in that at least one web, through which an optical unit is directed from the proximal end of the shaft into a bore of a shaft tip, is arranged on an inner wall of a shaft. The at least one web is configured in such a way that the distal tip of the optical unit is guided into the bore when the optical unit is inserted into the shaft, specifically regardless of the shape of the cross section of the shaft.

17 Claims, 4 Drawing Sheets

HANDHELD SURGICAL DEVICE AND SHAFT FOR A HANDHELD SURGICAL DEVICE

Figure 1:
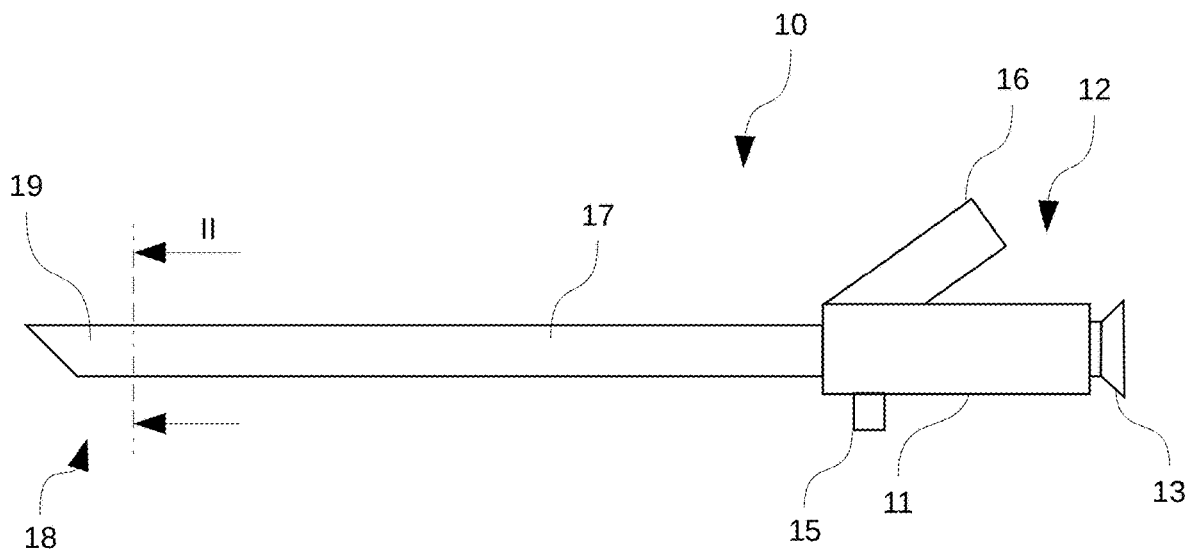

The invention relates to a shaft for a handheld surgical device according to the preamble of claim 1. The invention furthermore relates to a handheld surgical device as claimed in claim 12.

Handheld surgical devices, for example endoscopes, resectoscopes, cystoscopes and the like, essentially consist of a device body, or main body, and a tubular shaft. Through the shaft, various instruments for medical treatment of a person may be introduced into the body of the person. The instruments may be an optical unit or, in the case of a resectoscope, an electrode carrier, or access articles, for example a catheter, wires or the like. In the case of most instruments, it is intended here that they can be moved in the shaft parallel to the longitudinal direction of the latter. The space which is not occupied by the optical unit in the shaft is referred to as a working channel. Through this working channel, the further instruments may be introduced into the shaft, or into the body.

In order to carry out the treatment of body tissue by means of a catheter, for example, the treatment space is recorded by an optical unit during the use of the catheter. For this purpose, both the rod-shaped optical unit and the catheter are guided through the shaft, and therefore through the shaft tip of the shaft. So that the optical unit is always aligned in a predefined position relative to the shaft, and therefore receives an ideal view of the treatment site, it is fixed inside a bore in the shaft tip. For this purpose, before the start of the treatment, the optical unit is inserted into the shaft from the proximal end of the shaft and is positioned with its distal end in the distal bore of the shaft. The region below the optical unit is used to introduce the further access articles, for example the catheter, into the shaft. This working channel is also formed by the outer wall of the optical unit here.

This above-described positioning of the optical unit and of the access article inside the shaft works well in particular when the cross section of the working channel is small in comparison with the diameter of the optical unit. In this case, the cross section of the shaft may be configured in the shape of a drop. When the optical unit is introduced into this drop-shaped shaft, the optical unit is automatically positioned in the wider region of the shaft and is thereby guided with the distal end into the bore. The access article is subsequently guided into the free working channel below the optical unit. The operator therefore knows how the optical unit and also the distal end of the access article are positioned relative to the shaft tip. Besides the bore, the shaft tip has a second opening through which the distal end of the access article is guided. This second opening may optionally be guided slightly downward, that is to say away from the bore.

It has been found to be problematic when the diameter of the working channel in comparison with the optical unit is greater than in the case described above. If the working channel has a similar diameter to the optical unit, the cross section of the shaft must be configured accordingly. The cross section of the shaft may here be configured ovally or circularly. Because of such a cross-sectional shape, however, the optical unit is no longer automatically guided into the bore during insertion into the shaft, but sags and thereby blocks the working channel. Furthermore, the distal end of the optical unit may jam in the distal opening of the working channel, which leads to an interruption or time delay in the use of the handheld surgical device.

The object of the present invention is to provide a shaft and a handheld surgical device, with which an optical unit and an access article may be positioned in a simple and reliable way in the shaft.

A solution to this object is described by the features of claim 1. It is accordingly provided that at least one web, through which the optical unit is directed from the proximal end of the shaft into the bore of the shaft tip, is arranged on an inner wall of the shaft. The at least one web is configured in such a way that the distal tip of the optical unit is guided into the bore when the optical unit is inserted into the shaft, specifically regardless of the shape of the cross section of the shaft. In this way, it is possible to ensure that the optical unit is always directed into the correct position, namely into the bore of the shaft tip. As soon as the optical unit is positioned inside the shaft, the further access articles may also be guided in a simple and reliable way into the shaft tip through the working channel which is then formed.

Preferably, the invention provides that two opposite webs are arranged on the inner wall of the shaft. By the use of two webs which are positioned on opposite sides of the inner wall inside the shaft, the positioning of the optical unit inside the shaft may be made even more reliable. Owing to this symmetrical arrangement of the webs, the optical unit is guided with high precision into the bore of the shaft tip. This compulsory guiding may preclude the optical unit from being introduced into the shaft in an unintended way.

According to one particularly preferred exemplary embodiment of the invention, the web may extend in a U-shape along the inner wall of the shaft, the open sides of the web facing in the direction of the bore. By this obliquely set U inside the shaft, the distal end of the optical unit is provided with a ramp on which the optical unit is directed into the bore. Owing to this configuration of the web, the optical unit may be guided into the correct position inside the shaft tip, particularly in the case of oval or circular cross sections of the shaft. What is essential here is that the at least one web is aligned obliquely relative to a longitudinal axis of the shaft, specifically in the direction of the bore. By this oblique orientation of the at least one web relative to the bore and the longitudinal axis of the shaft, the optical unit slides on this ramp-like arrangement directly into the bore of the shaft tip.

In particular, it may furthermore be provided that a cross section of the at least one web is concavely configured. By this concave shape of the web, the distal end of the optical unit is received without the optical unit being able to catch inside the shaft. The access article subsequently to be introduced also cannot jam or catch on the concave shape of the at least one web. By the concave shaping, the wall thickness of the shaft is increased continuously at the locations of the at least one web. Owing to this continuous widening of the wall thickness, the at least one web does not form a mechanical barrier for any objects or articles to be introduced into the shaft. The access articles which encounter the web during the introduction into the shaft are directed back into the middle of the shaft by the concavity. Blocking of the access article inside the shaft is therefore prevented.

The invention may furthermore provide that the distance between the two webs, or between the two sides of the U-shaped web, is from 1 mm to 4 mm, in particular from 2 mm to 4 mm, preferably 3.6 mm, or is less than a diameter of the optical unit. Furthermore, it may be provided that the distance between the two webs, or between the two sides of the U-shaped web, is greater than a diameter of the access article. This configuration of the webs ensures that the optical unit is guided upward into the bore and the access article remains in the lower section, or the working channel. Owing to the fact that the spacing of the webs is greater than the dimension of the access article, the latter cannot catch inside the working channel, or on the two webs. The operator may therefore introduce first the optical unit and then the access article into the shaft in a very simple and reliable way, specifically without exercising particular precaution in respect of possible blocking.

Furthermore, it may be provided according to the invention that a separating wall between the bore and the working channel is constituted in such a way that the access article is guided downward, that is to say away from the bore. This separating wall may likewise have a concavity in order to guide the article into the correct position inside the shaft tip in a particularly reliable way, and also to make the withdrawal of the access article from the shaft simple and reliable.

According to a further advantageous exemplary embodiment of the invention, the at least one web may be an end face of a widening of the wall of the shaft tip. Because the wall of the shaft is also widened after the at least one web as seen in the distal direction, or the wall has the thickness of the web, the access article cannot be blocked or remain caught on the web during withdrawal from the shaft. The wall thickness of the working channel is thus made greater than the wall thickness of the bore and/or of the shaft.

A handheld surgical device for achieving the object mentioned in the introduction is described by the features of claim 12. Accordingly, it is provided that a handheld surgical device, in particular a cystoscope, a resectoscope or the like, comprises a shaft as claimed in at least one of claims 1 to 11.

Figure 2:
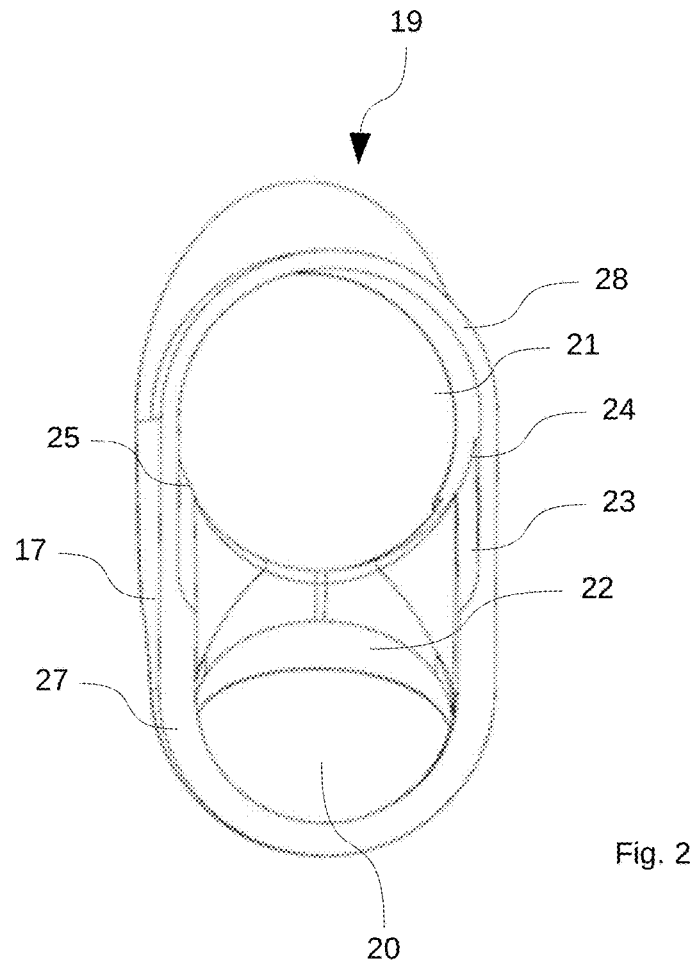
Figure 3A:
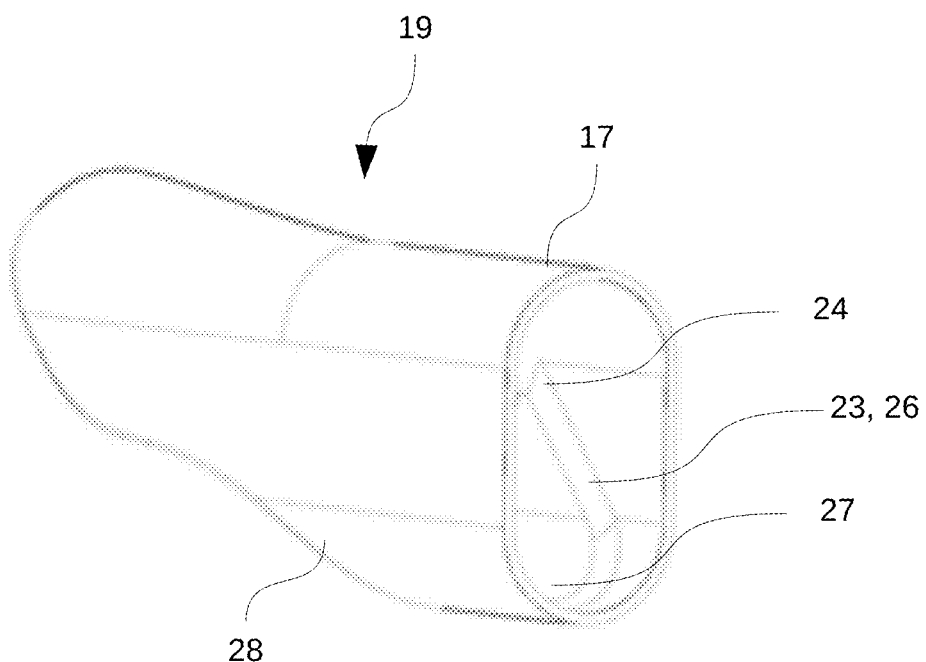
Figure 3B:
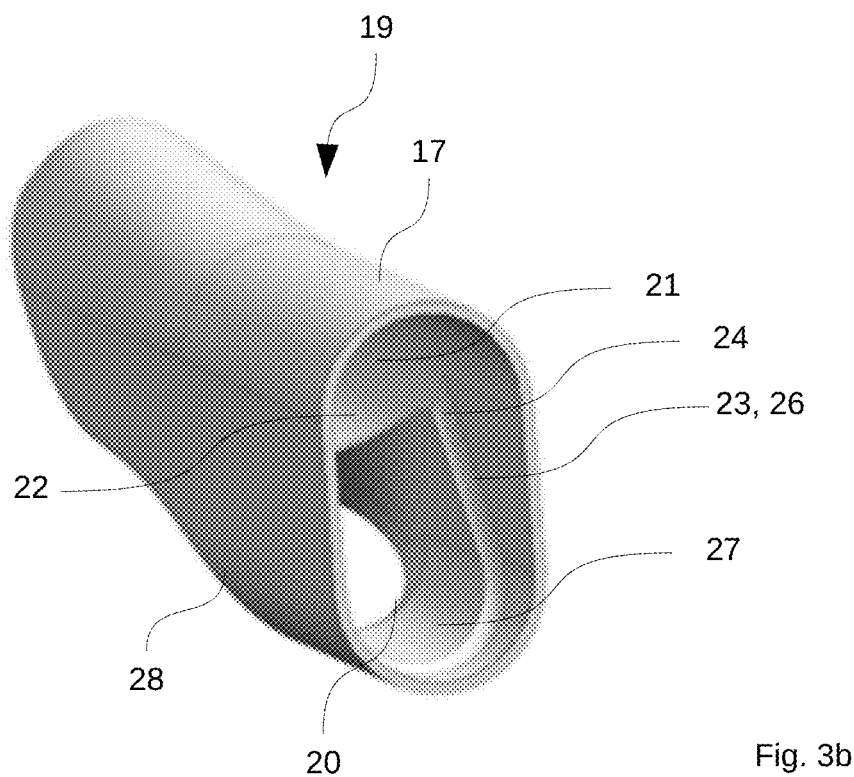
Figure 4:
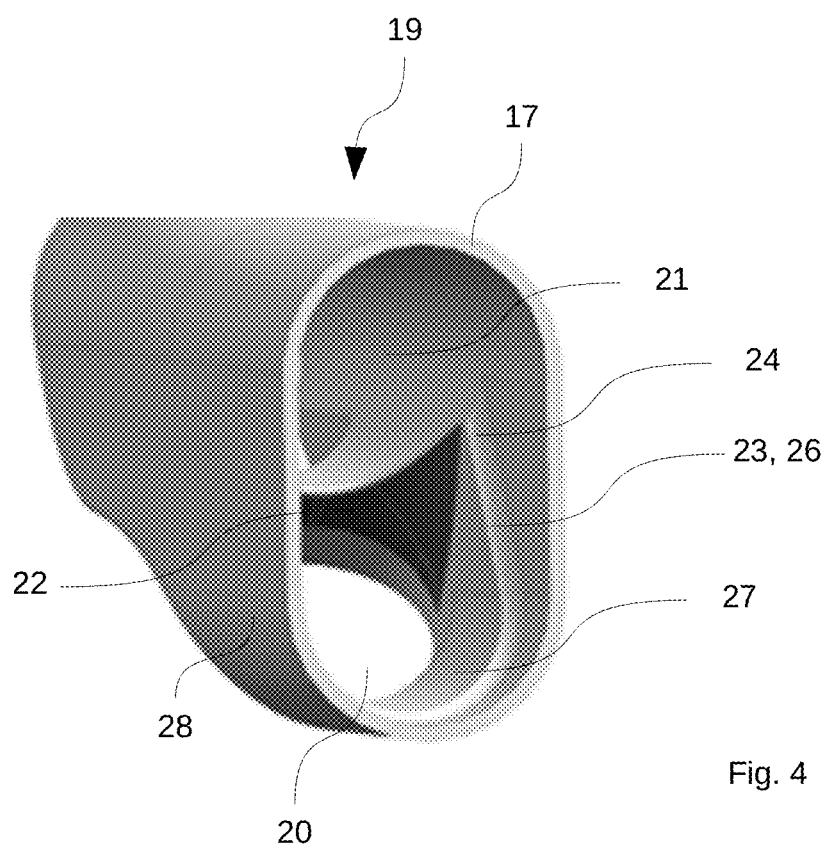
Figure 5:
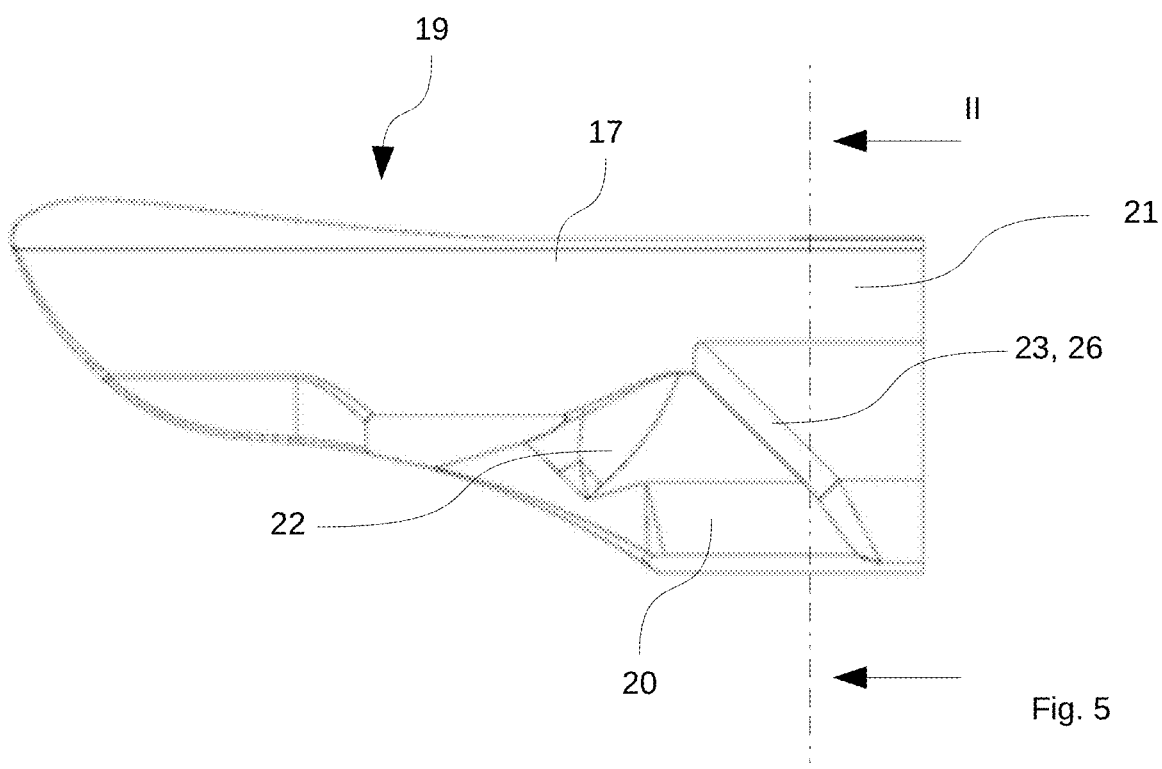
Figures 6A, 6B, 6C:
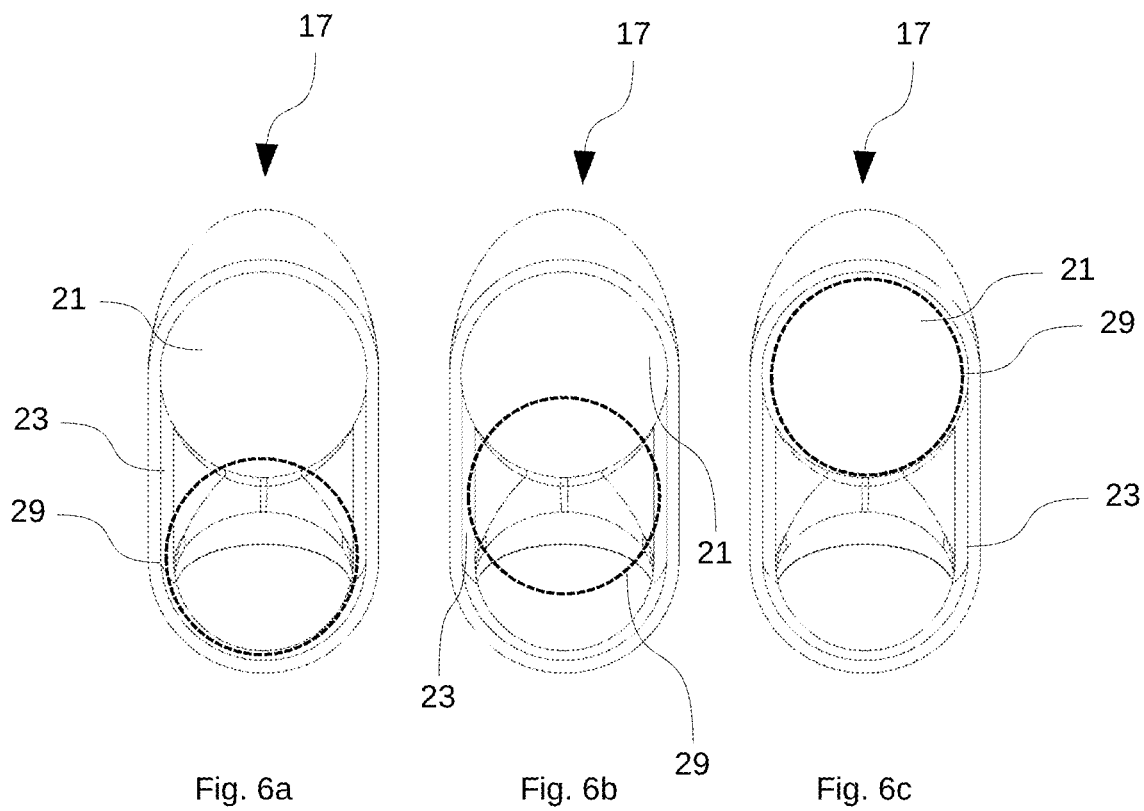
Figures 7A, 7B, 7C:
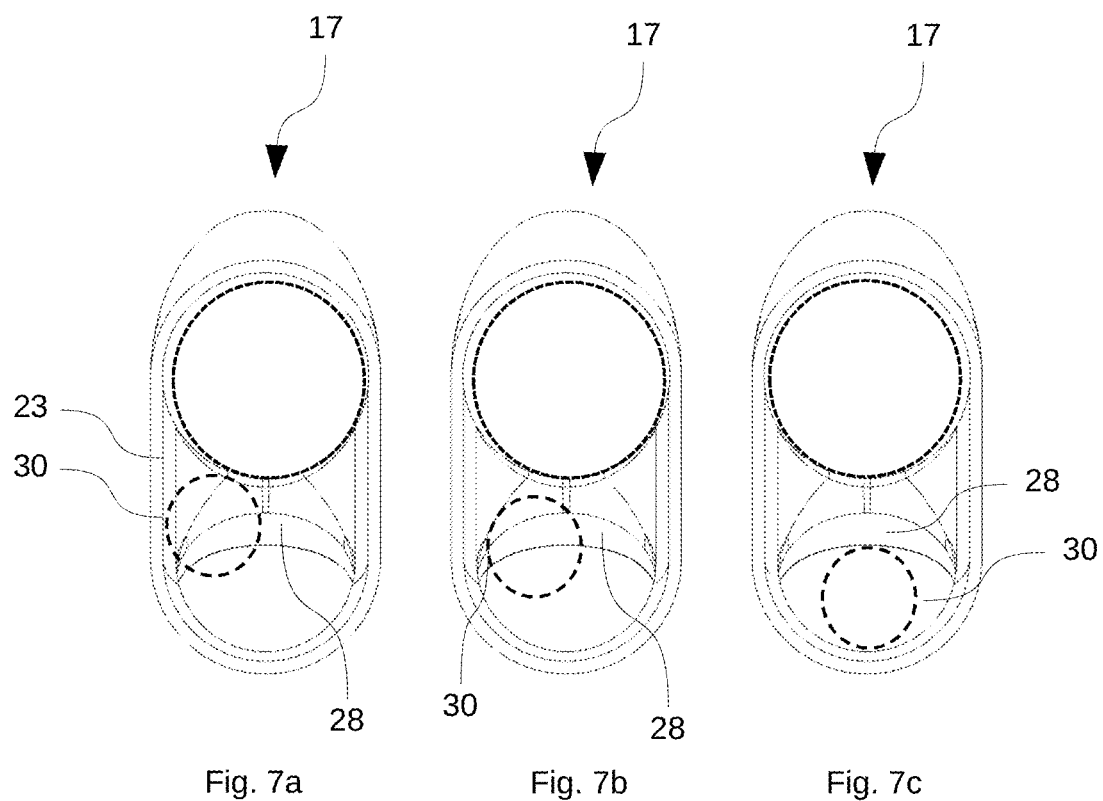

A preferred exemplary embodiment of the invention will be described in more detail below with the aid of the drawing, in which:

FIG. 1 shows a schematic representation of a handheld surgical device,

FIG. 2 shows a sectional representation through the shaft tip according to FIG. 1, FIG. 3a shows a perspective representation of a shaft tip, FIG. 3b shows a further perspective representation of the shaft tip, FIG. 4 shows a detail enlargement of the representation according to FIG. 2b, FIG. 5 shows a sectional representation through the shaft tip, FIG. 6a shows a schematic representation of a locating of an optical unit, FIG. 6b shows a further schematic representation of the locating of the optical unit, FIG. 6c shows a further schematic representation of the locating of the optical unit, FIG. 7a shows a schematic representation of a locating of an access article, FIG. 7b shows a further schematic representation of the locating of the access article, and FIG. 7c shows a further schematic representation of the locating of the access article.

In FIG. 1, a handheld surgical device 10 is represented in a highly schematized way for better illustration. This handheld surgical device 10 comprises a device body 11, which may also be configured as a gripping unit. Furthermore, an eyepiece 13 for an optical unit 14 is arranged at a proximal end 12 of the device body 11. In addition, the device body 11 represented here purely schematically comprises two connections 15, 16. These connections 15, 16 may be used either to supply the handheld surgical device 10 with electrical energy, light or a fluid, or as a port for further instruments.

Arranged at an opposite end from the proximal end 12 of the device body 11, there is a tubular shaft 17. This shaft 17 is elongately configured and is used to be introduced with a distal end 18 of the shaft 17, or with a shaft tip 19, into the patient. This shaft 17 is also represented in a highly schematized way in FIG. 1, and serves merely for better understanding of the invention described here. It should expressly be pointed out here that such a shaft 17 may also be coupled to other surgical devices. The oblique configuration of the shaft tip 19 of the shaft 17 is thus also to be regarded as highly schematized. Specifically, it is thus entirely provided that the shape of the chamfer may differ greatly from that represented in FIG. 1.

In the handheld surgical device 10 described here, it is provided that both an optical unit (not represented) and an access article (not represented), which may for example be a catheter, are guided through the shaft 17. The two aforementioned items are inserted here into the shaft 17 from the proximal end 12 of the handheld device 10, specifically until the rod-shaped optical unit, which may be a light guide or a rod lens system, looks out from the distal end 18 of the shaft 17 by way of its distal end. The access article is likewise moved through the shaft 17 until it protrudes from the distal end 18 of the shaft 17. The optical unit and the access article are mounted here parallel to one another and parallel to a longitudinal axis of the shaft 17. In preparation for the treatment or operation to be carried out, the optical unit is initially guided into the shaft 17. The optical unit is in this case positioned in an upper region of the shaft 17. The space formed below the optical unit inside the shaft 17 is referred to as a working channel 20 and is used to receive the access article. In the exemplary embodiment described here, the extent of the cross section of the working channel 20 is approximately equal to the diameter of the optical unit. Correspondingly, the cross section of the shaft 17 is configured ovally. It is, however, likewise conceivable for the cross section of the shaft 17 to have a different shape.

FIG. 2 represents a section through the distal end 18 of the shaft 17, or through the shaft tip 19, the view being in the distal direction. In particular, this sectional representation reveals the oval cross-sectional shape of the shaft 17. While there is a bore 21 for receiving the distal end of the optical unit in the upper region of the shaft 17, the working channel 20 for receiving the access article is arranged underneath. Between the bore 21 and the working channel 20, there is a separating wall 22 which separates the two openings from one another (FIG. 5). While the bore 21 is aligned parallel to the longitudinal axis of the shaft 17 and the optical unit therefore looks directly in the distal direction, the working channel 20 is inclined slightly downward in the shaft tip 19 so that the opening of the working channel 20 appears as oval in FIG. 2. This separation of the bore 21 from the working channel 20 by the separating wall 22 is restricted exclusively to the shaft tip 19, that is to say the internal space of the shaft 17 is substantially empty and the optical unit can initially be guided freely into the shaft.

It may be seen from FIGS. 3a and 3b that a web 23 is arranged in front of the bore 21 inside the shaft 17. In the exemplary embodiment of the shaft 17 as represented here, the web 23 is configured in the shape of a U, the two free ends 24, 25 of the U being oriented in the direction of the bore 21. The web 23 is aligned obliquely relative to the longitudinal axis of the shaft 17, so that it constitutes a ramp in the direction of the bore 21 (FIG. 5). The width of the web 23, or of the sides, may be from a few tenths of a millimeter to 1 or 2 mm. Furthermore, it is provided according to the invention that the web 23 is preferably concavely configured, that is to say that the end face 26 of the web 23 is curved. The two free ends 24, 25 of the web end directly in the bore 21 for the optical unit. Furthermore, the web 23 also forms the end face 26 of a widening 27 of the wall 28 of the shaft 17 at the distal end 18.

The spacing of the free ends 24, 25 of the web 23, or the spacing of the two sides of the U, is less than the diameter of the optical unit. When the optical unit is introduced into the shaft 17, the distal end of the optical unit is therefore directed in the manner of a ramp over the web 23 into the bore 21. Ultimately, this constitutes compulsory guiding for the optical unit. There is no other possibility for the optical unit to be inserted into the shaft 17 than to slide into the bore 21. By this positioning of the optical unit in the bore 21, the optical unit is fixed in this position. The working channel 20 is therefore formed automatically below the optical unit.

It may be seen from FIG. 4 that the separating wall 22 is configured hyperbolically, or concavely, in the direction of the working channel 20. The effect of this curved shape of the separating wall 22 is that the access article which is guided through the working channel 20 is directed into the distal open end of the working channel 20. Here again there is ultimately no other possibility available to the access article than to slide through the working channel 20.

A further essential feature of the invention is that the spacing of the free ends 24, 25 of the web 23, or the spacing of the two sides of the U, is greater than the diameter of the access article. This has the effect that the access article, when it meets the web 23 during introduction into the shaft 17, is deflected toward the middle of the working channel 20 and does not directly encounter the opposite side of the web 23. A further feature, which serves to direct the access article into the correct direction, is that the end face 26 of the web 23 is concavely curved. In particular, this curvature offers the advantage that the access article cannot become stuck inside the working channel 20. During the withdrawal of the access article from the working channel 20, the widening 27 of the wall 28 and the web 23 also behave in such a way that jamming or catching can be precluded.

FIGS. 6a to 6c and 7a to 7c schematically illustrate the way in which the optical unit and the access article are directed into the correct positions by the features according to the invention. The aforementioned figures show a sectional representation through the shaft tip 19 according to FIG. 2. FIG. 6a shows the situation where the highly schematized tubular optical unit 29 is introduced into the shaft 17 and has not yet been fixed in its final position. The position during introduction into the shaft 17 is somewhat random here. In the case represented here, the optical unit 29 is located in the lower region of the shaft 17. When the optical unit 29 is inserted further in the direction of the distal end 18 of the shaft 17, it meets the web 23. Because of the ramp-like oblique setting of the web 23, the optical unit 29 is automatically directed into the bore 21 (FIG. 6b, FIG. 6c). In this position represented in FIG. 6c, the optical unit 29 is fixed. By this fixing of the optical unit 29, the working channel 20 is formed below the optical unit 29.

As soon as the optical unit 29 is fixed inside the bore 21, the access article 30 (likewise represented in a highly schematized way in FIGS. 7a to 7c) can be guided into the working channel 20. Here again, FIG. 7a initially describes a situation which is actually critical for the introduction of the access article 30 into the working channel 20. The distal end of the access article 30 meets the web 23. Yet because the web is concavely configured, the access article 30 is directed according to FIG. 7b to the middle of the working channel 20. As already mentioned, a further essential feature is that the spacing of the sides of the web 23 is greater than the diameter of the access article 30. During further introduction of the access article 30 into the working channel 20, the access article 30 meets the separating wall 22 (FIG. 7b). Since this separating wall 22 also has a curvature, the access article 30 is guided through the working channel 20, or deflected downward in the direction of the opening of the working channel 20 (FIG. 7c). Owing to the features according to the invention, both the optical unit 29 and the access article 30 are directed precisely into the predetermined positions inside the shaft 17 in a simple and very reliable way. Any risk that the optical unit 29 or the access article 30 will jam during introduction into the shaft or during withdrawal from the shaft 17 is prevented by the aforementioned features.

The invention claimed is:

1. A shaft for a handheld surgical device for receiving an optical unit and at least one further access article, the shaft comprising:
   an elongated tubular body having a proximal end configured to be coupled to a device body of the handheld device;
   a shaft tip at a distal end of the shaft, the shaft tip having a bore and a working channel arranged next to the bore, the bore being configured to receive the optical unit and the working channel being configured to receive the access instrument; and
   a first web arranged on an inner wall of the shaft and oriented obliquely relative to a longitudinal axis of the shaft in the direction of the bore, the first web being configured to guide the optical unit from the proximal end of the shaft into the bore of the shaft tip.

2. The shaft for a handheld surgical device as claimed in claim 1, further comprising a second web arranged radially opposite to the first web on the inner wall of the shaft.

3. The shaft for a handheld surgical device as claimed in claim 2, wherein the distance between the first web and the second web is from 1 mm to 4 mm.

4. The shaft for a handheld surgical device as claimed in claim 1, wherein the distance between the first web and the second web is greater than a diameter of the access article.

5. The shaft for a handheld surgical device as claimed in claim 2, wherein the distance between the first web and the second web is less than a diameter of the optical unit.

6. The shaft for a handheld surgical device as claimed in claim 2, wherein the distance between the first web and the second web is greater than a diameter of the access article.

7. The shaft for a handheld surgical device as claimed in claim 1, wherein the first web extends in a U-shape along the inner wall of the shaft, the open side of the U-shape facing the bore.

8. The shaft for a handheld surgical device as claimed in claim 7, wherein the distance between the two sides of the U-shaped web is from 1 mm to 4 mm.

9. The shaft for a handheld surgical device as claimed in claim 7, wherein the distance between the two sides of the U-shaped web is less than a diameter of the optical unit.

10. The shaft for a handheld surgical device as claimed in claim 7, wherein the distance between the two sides of the U-shaped web is greater than a diameter of the access article.

11. The shaft for a handheld surgical device as claimed in claim 1, wherein a cross section of the first web is concavely configured.

12. The shaft for a handheld surgical device as claimed in claim 1, wherein a separating wall between the bore and the working channel is constituted in such a way that the access article is guided downward.

13. The shaft for a handheld surgical device as claimed in claim 1, wherein the first web is an end face of a widening of the inner wall of the shaft tip.

14. The shaft for a handheld surgical device as claimed in claim 1, wherein a thickness of a wall surrounding the working channel is greater than a thickness of a wall surrounding the bore.

15. The shaft for a handheld surgical device as claimed in claim 1, wherein a cross section of the shaft is oval or drop-shaped.

16. A handheld surgical device having a shaft as claimed in claim 1.

17. The shaft for a handheld surgical device as claimed in claim 1, wherein the device body is configured as a gripping unit.

* * * * *